(12) United States Patent
Ambartsoumian

(10) Patent No.: US 11,615,718 B2
(45) Date of Patent: Mar. 28, 2023

(54) LABEL FOR MICROSCOPE SLIDE AND METHOD OF APPLYING

(71) Applicant: Gourgen Ambartsoumian, Laval (CA)

(72) Inventor: Gourgen Ambartsoumian, Laval (CA)

( * ) Notice: Subject to any disclaimer, the term of this patent is extended or adjusted under 35 U.S.C. 154(b) by 419 days.

(21) Appl. No.: 16/758,425

(22) PCT Filed: Oct. 25, 2018

(86) PCT No.: PCT/CA2018/051351
§ 371 (c)(1),
(2) Date: Apr. 23, 2020

(87) PCT Pub. No.: WO2019/079898
PCT Pub. Date: May 2, 2019

(65) Prior Publication Data
US 2020/0251020 A1 Aug. 6, 2020

Related U.S. Application Data

(60) Provisional application No. 62/623,083, filed on Jan. 29, 2018, provisional application No. 62/592,702, (Continued)

(51) Int. Cl.
*G09F 3/10* (2006.01)
*G09F 3/02* (2006.01)
(Continued)

(52) U.S. Cl.
CPC ............ *G09F 3/0288* (2013.01); *B65C 1/04* (2013.01); *G09F 3/10* (2013.01); *G02B 21/34* (2013.01); *G09F 2003/0229* (2013.01)

(58) Field of Classification Search
CPC .. G09F 3/0288; G09F 3/10; G09F 2003/0229; G09F 3/0297; G09F 2003/023; B65C 1/04; G02B 21/34
See application file for complete search history.

(56) References Cited

U.S. PATENT DOCUMENTS 4,481,246 A 11/1984 Melisz et al.
5,044,500 A * 9/1991 Webber .................. G02B 21/34
206/455

(Continued)

FOREIGN PATENT DOCUMENTS

WO 2008049172 A1 5/2008

*Primary Examiner* — Cassandra Davis
(74) *Attorney, Agent, or Firm* — Norton Rose Fulbright Canada LLP

(57) ABSTRACT

There is disclosed a label for a microscope slide having a width and a thickness. The label includes a body having a top side and an underside with adhesive. The body defines at least a first panel, a second panel and a third panel. At least one of the panels covers the width of a section of the slide. The label includes at least two folding strip sections. A first of the strip sections is between the first panel and the second panel. A second of the strip sections is between the second panel and the third panel. The strip sections cover the thickness of the section of the slide. A pre-application fold lines demarcates the strip sections from the adjacent panels. The first panel receives information thereon or covers information on the slide, and the third panel is transparent. A method for applying a label is also disclosed.

22 Claims, 11 Drawing Sheets

Related U.S. Application Data filed on Nov. 30, 2017, provisional application No. 62/576,987, filed on Oct. 25, 2017.

(51) Int. Cl.
*B65C 1/04* (2006.01)
*G02B 21/34* (2006.01)

(56) References Cited

U.S. PATENT DOCUMENTS

| | | | | |
|---|---|---|---|---|
| 5,598,295 | A | * | 1/1997 | Olofson .................. G02B 21/34 359/398 |
| 5,683,786 | A | * | 11/1997 | Kavanaugh ........... C03C 17/001 428/210 |
| 5,866,241 | A | | 2/1999 | Xiang |
| 5,918,316 | A | * | 7/1999 | Nathanson .............. G09F 21/02 2/244 |
| 5,919,553 | A | | 7/1999 | Kavanaugh |
| 6,159,321 | A | * | 12/2000 | Whisson .............. B01D 21/262 156/308.2 |
| 6,597,500 | B1 | | 7/2003 | Burke et al. |
| 8,100,319 | B2 | * | 1/2012 | Wittmeyer, Jr. .......... B42F 7/04 229/67.3 |
| 10,894,627 | B1 | * | 1/2021 | Nicholson ............ B65D 5/4245 |
| 2009/0241384 | A1 | * | 10/2009 | Duffy .................... G09F 3/0295 40/316 |
| 2012/0262783 | A1 | * | 10/2012 | Mohammad ........... G02B 21/34 359/393 |

\* cited by examiner

LABEL FOR MICROSCOPE SLIDE AND METHOD OF APPLYING

CROSS-REFERENCE TO RELATED APPLICATION

The present application claims the priorities of U.S. Patent Application No. 62/576,987, filed on Oct. 25, 2017, of U.S. Patent Application No. 62/592,702, filed on Nov. 30, 2017, and of U.S. Patent Application No. 62/623,083, filed on Jan. 29, 2018, all of which are incorporated herein by reference.

TECHNICAL FIELD

The present application relates to the labeling of microscope slides.

BACKGROUND OF THE INVENTION

It is often required in laboratories to identify microscope slides. One common approach is to write down information directly on the microscope slide. Another approach is to position labels on the microscope slides distant to the sample or area where the sample will be put. While these solutions are simple, they cause the risk that information written on the slide is deleted or smudged by manipulation or because of the use of chemicals and solvents used in the treatment of the microscope slides.

SUMMARY OF THE INVENTION

It is an aim of the present disclosure to provide a label for microscope slides that addresses issues related to the prior art.

It is another aim of the present disclosure to provide a method of applying a label to a microscope slide that addresses issues related to the prior art.

In accordance with a first embodiment, there is provided a label for a microscope slide having a width W and a thickness T, the label comprising: a body having a top side and an underside with adhesive, the body defining at least a first panel, a second panel and a third panel, at least one of the panels configured to cover the width W of a section of the microscope slide, at least two folding strip sections, a first of the folding strip section being between the first panel and the second panel, a second of the folding strip section being between the second panel and the third panel, the folding strip sections configured to cover the thickness T of the section of the microscope slide, and pre-application fold lines demarcating the folding strip sections from the adjacent panels; wherein the first panel is configured to receive information thereon or to cover information on the microscope slide, and the third panel is transparent.

Further in accordance with the first embodiment, for example, the second panel is between the first panel and the third panel in an elongated direction of the body. Further in accordance with the first embodiment, for example, the second panel has a width equal to W±5% in the elongated direction. Further in accordance with the first embodiment, for example, the label further includes a fourth panel and a third folding strip section, the fourth panel connected to another one of the panels by the third folding strip section. Further in accordance with the first embodiment, for example, the fourth panel is connected to the first panel or to the third panel by the third folding strip section, such that the body has a L shape. Further in accordance with the first embodiment, for example, the fourth panel is connected to the second panel the third folding strip section, such that the body has a T shape. Further in accordance with the first embodiment, for example, the pre-application fold lines are defined by spaced apart cuts in a facestock of the body. Further in accordance with the first embodiment, for example, each folding strip section has at least two parallel pre-application fold lines. Further in accordance with the first embodiment, for example, the two parallel pre-application fold lines are separated by a distance equal to T±70%. Further in accordance with the first embodiment, for example, at least one folding strip section has at least three parallel pre-application fold lines. Further in accordance with the first embodiment, for example, adjacent pairs of the pre-application fold lines of the at least one folding strip section are separated by a distance equal to to T±70%. Further in accordance with the first embodiment, for example, the first panel is opaque or transparent. Further in accordance with the first embodiment, for example, the second panel is opaque or transparent. Further in accordance with the first embodiment, for example, the label further includes a support liner upon which the body is releasably adhered. Further in accordance with the first embodiment, for example, the label further includes a release coating on the support liner. Further in accordance with the first embodiment, for example, the body has a transparent facestock with an adhesive layer defining the underside. Further in accordance with the first embodiment, for example, the body has an opaque ink on at most two of the panels, the third panel being without the opaque ink. Further in accordance with the first embodiment, for example, the label further includes another facestock layer on the transparent facestock, with an adhesive layer between the other facestock layer and the transparent facestock layer. Further in accordance with the first embodiment, for example, the other facestock layer is transparent or opaque. Further in accordance with the first embodiment, for example, the label further includes at least one electronic chip secured to the label.

In accordance with a second embodiment, there is provided a method for applying a label onto a microscope slide having a width W and a thickness T, the method comprising: adhering a first panel of the label to cover the width W of a first face of a section of the microscope slide, with a first folding strip section and a second panel of the label extending on one side beyond the section of the microscope slide, and with a second folding strip section and a third panel of the label extending on another side beyond the section of the microscope slide; folding the label such that the first folding strip section covers at least partially the thickness T of the one side of the section of the microscope slide, and the second panel adheres to a second face of the section of the microscope slide or to another part of the label, the second panel displaying information thereon facing away from the microscope slide; and folding the label such that the second folding strip section covers at least partially the thickness T of the other side of the section of the microscope slide, and the third panel adheres to and transparently covers the second panel.

Further in accordance with the second embodiment, for example, the method further includes separating the label from a support liner before adhering the first panel of the label to the first face of the section of the microscope slide. Further in accordance with the second embodiment, for example, separating the label from the support liner includes separating the label or support liner from a support liner roll. Further in accordance with the second embodiment, for example, separating the label from the support liner includes separating the label or support liner from a support liner sheet. Further in accordance with the second embodiment, for example, the method further includes printing information on at least the first panel prior to separating the label from the support liner. Further in accordance with the second embodiment, for example, the method further includes adding information with ink on the first face of the microscope slide prior to adhering the first panel of the label to the information with ink on the first face of the section of the microscope slide. Further in accordance with the second embodiment, for example, adhering the first panel of the label to the first face of the section of the microscope slide results in a third folding strip section and a fourth panel of the label extending on a third side beyond the section of the microscope slide, and further comprising folding the label such that the third folding strip section covers at least partially the thickness T of the third side of the section of the microscope slide, and the fourth panel adheres to a second face of the section of the microscope slide.

In accordance with a third embodiment, there is provided a roll of the labels as described above with reference to the first embodiment.

In accordance with a forth embodiment, there is provided a sheet of labels that includes a plurality of the labels described above with reference to the first embodiment.

BRIEF DESCRIPTION OF THE FIGURES PERFORATED

The layers and other components of the label and label material shown in the figures are for the purpose of visualizing the concept and may not necessarily be proportional to actual label sizes and label material construction.

BRIEF DESCRIPTION OF THE EMBODIMENTS

Figure 1A:
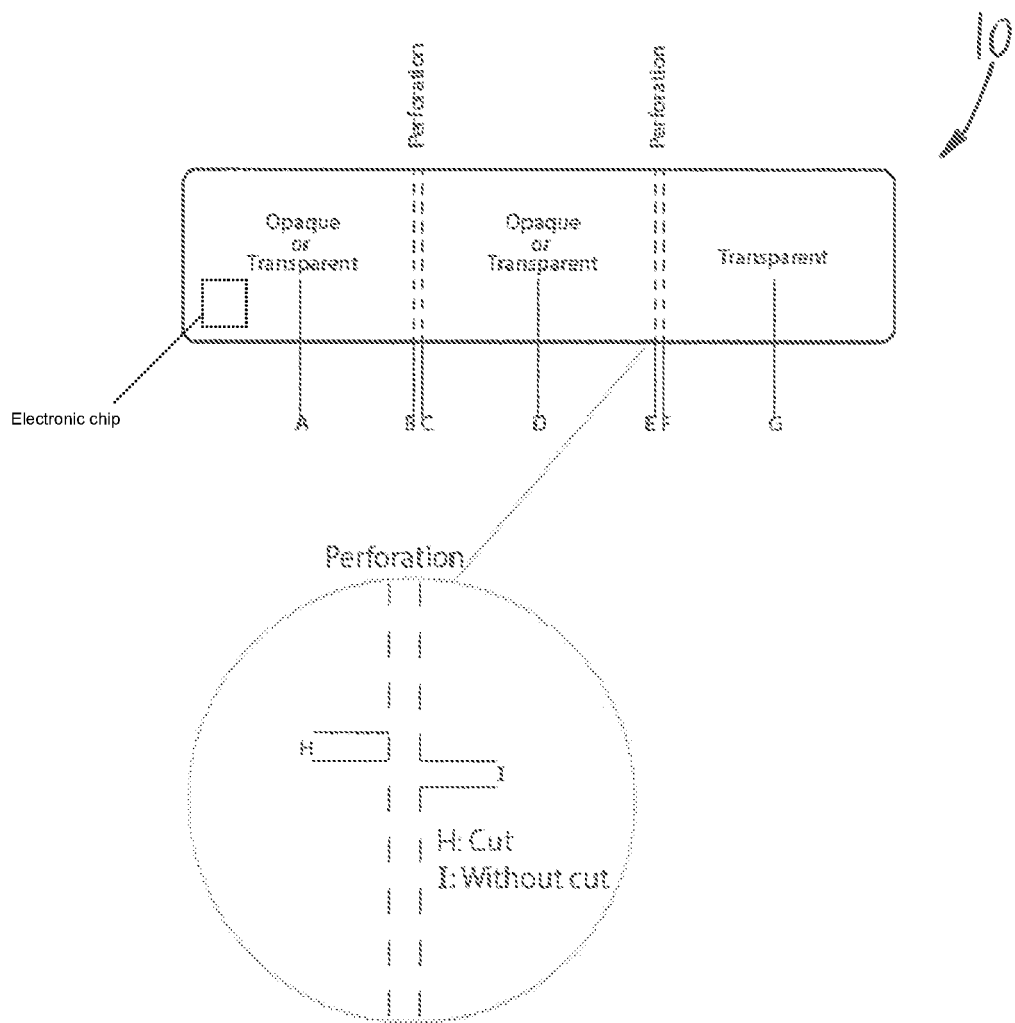
FIG. 1A is a face view of a label for a microscope slide in accordance with the present disclosure, with a zoom window showing an embodiment of a folding strip thereof.
Figure 1B:
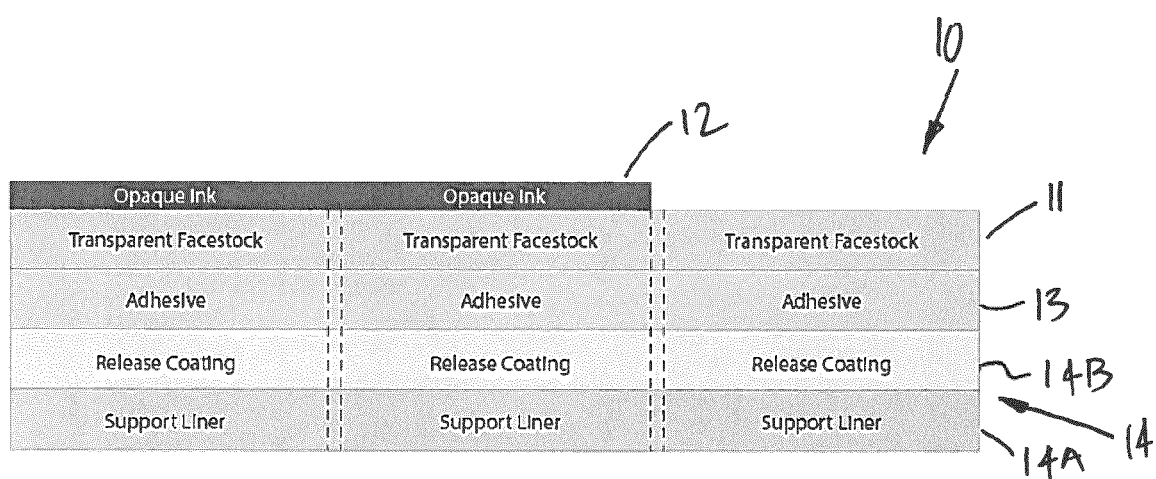
FIG. 1B is a schematic elevation view showing an exemplary construction of the label of FIG. 1A.
Figure 1C:
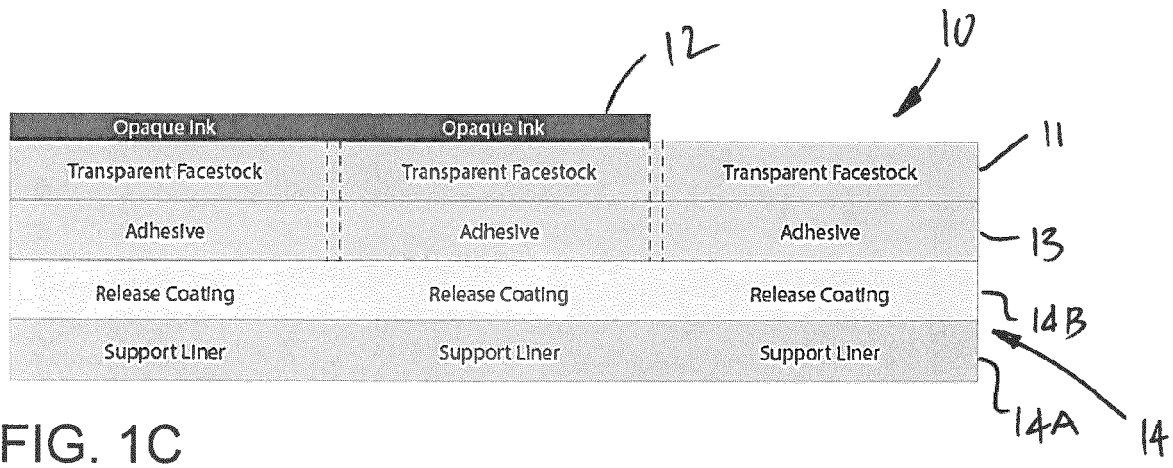
FIG. 1C is a schematic elevation view showing another exemplary construction of the label of FIG. 1A.
Figure 1D:
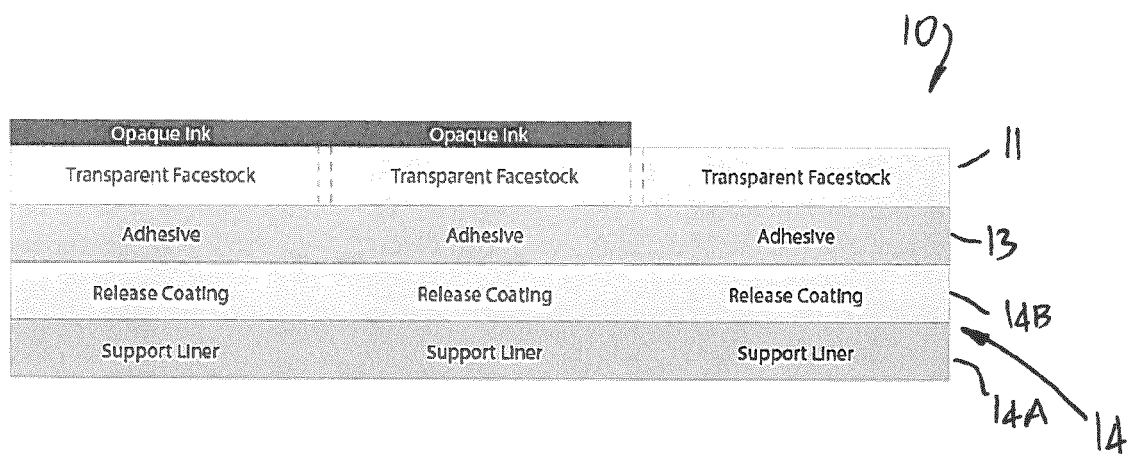
FIG. 1D is a schematic elevation view showing another exemplary construction of the label of FIG. 1A.
Figure 1E:
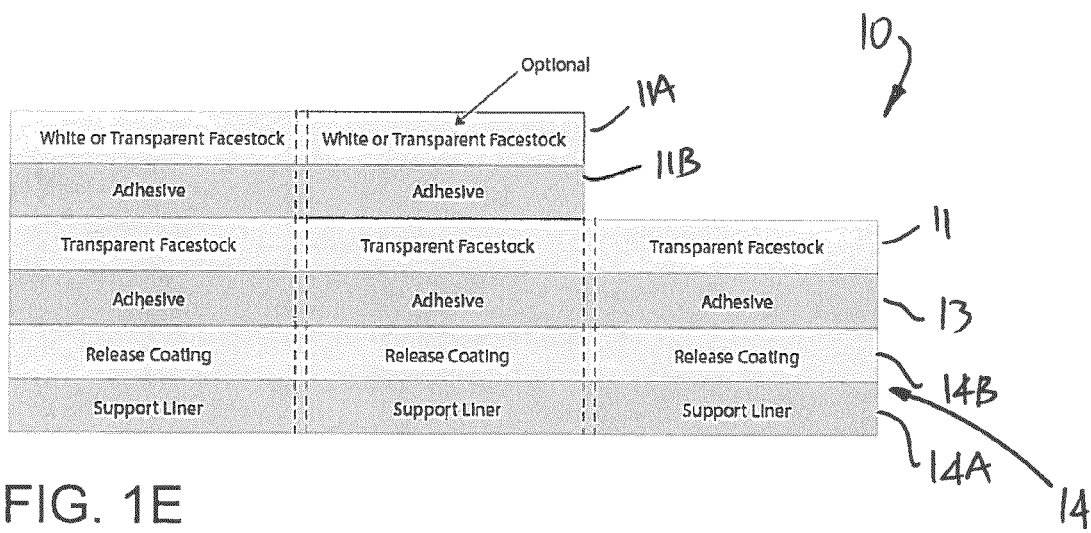
FIG. 1E is a schematic elevation view showing another exemplary construction of the label of FIG. 1A.
Figure 1F:
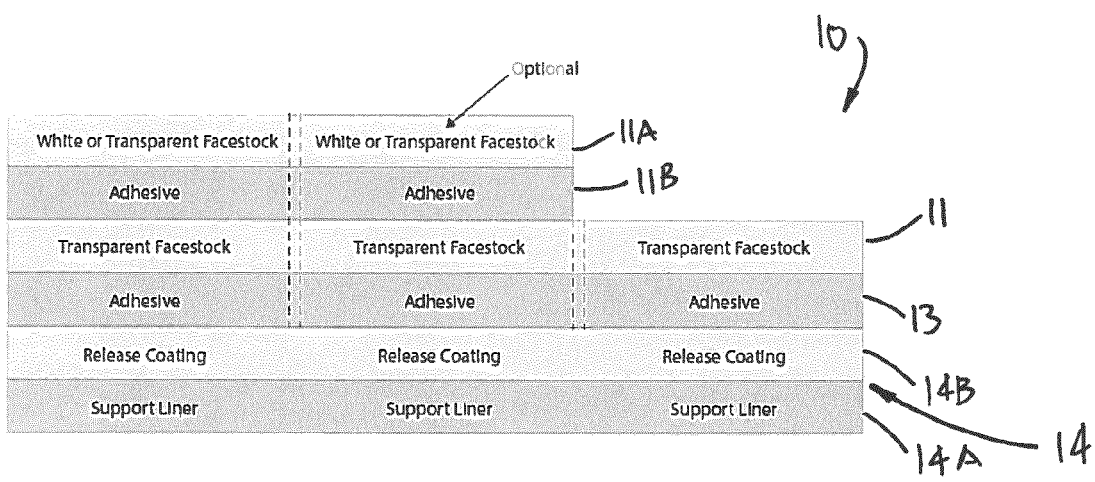
FIG. 1F is a schematic elevation view showing another exemplary construction of the label of FIG. 1A.
Figure 1G:
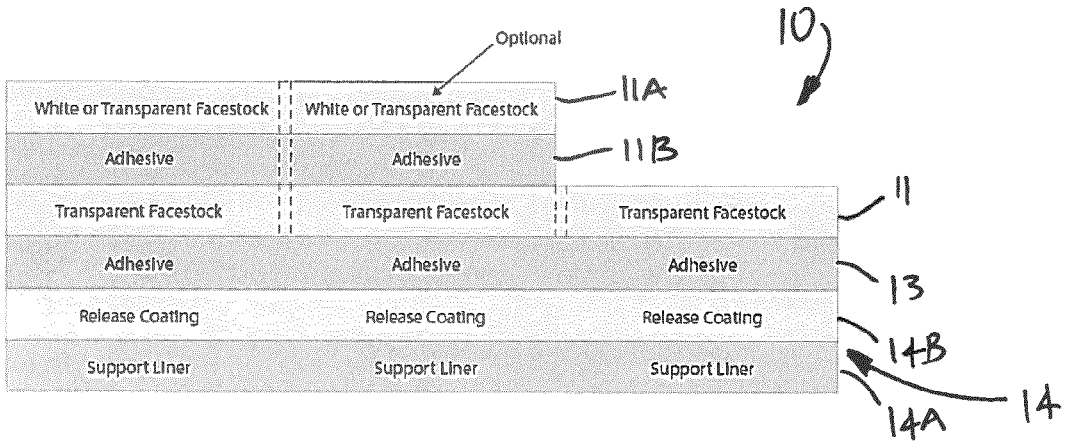
FIG. 1G is a schematic elevation view showing another exemplary construction of the label of FIG. 1A.
Figure 10:
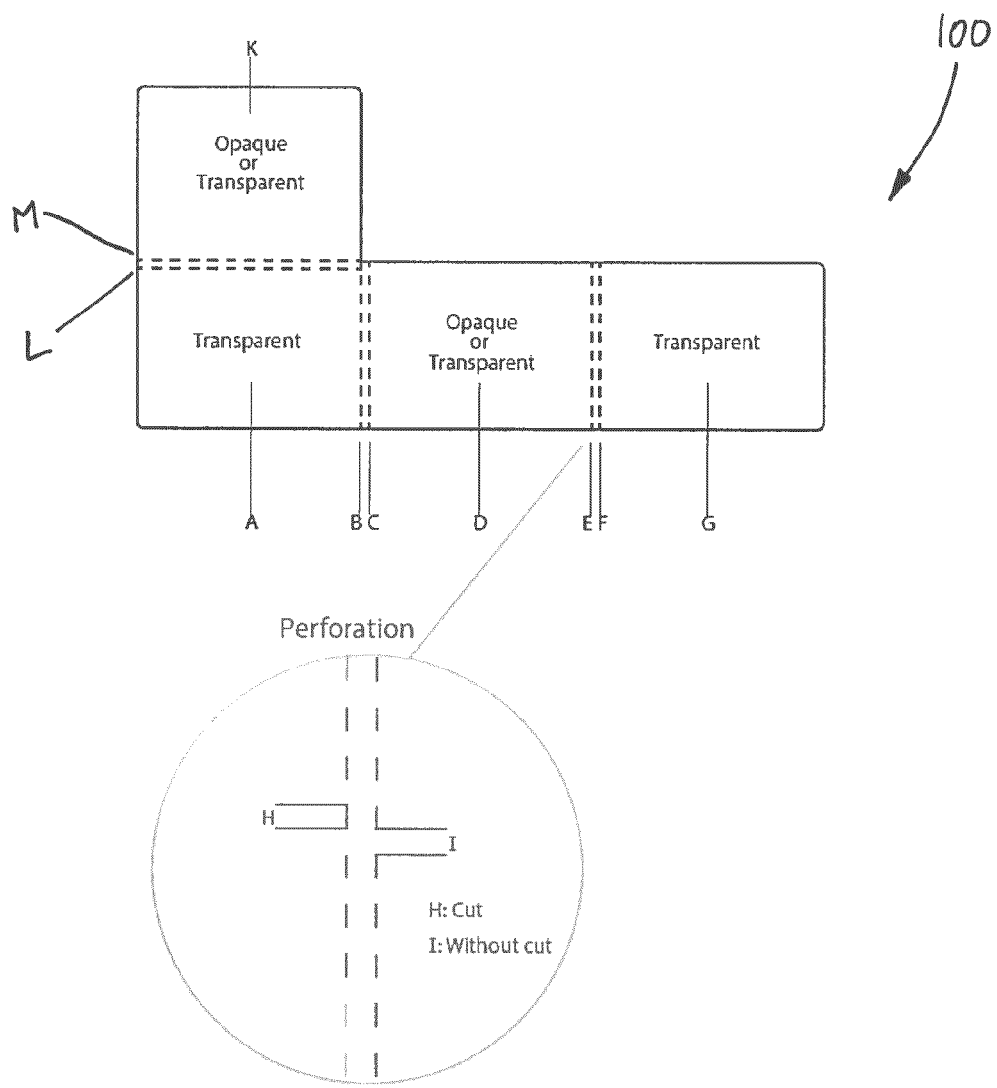
FIG. 10 is a face view of a label for a microscope slide in accordance with yet another embodiment the present disclosure, with a zoom window showing an embodiment of a folding strip thereof.

Referring to the drawings and more particularly to FIG. 1A, a label in accordance with a first embodiment of the present disclosure is generally shown at 10. The label 10 is of the type that may be used on a microscope slide having a width W and a thickness T. The label 10 may also be of the type used by a robotic device with automated manipulation of a slide. The microscope slides are conventionally rectangular in shape, with a length of about 3.0 inches, a width W of about 1.0 inch and a thickness T of about 0.0625 inch, though these dimensions are only provided as an example, as dimensions of microscope slides may differ from those provided above. The label 10 has a unitary one-piece construction, but may be divided in at least five different label portions. The one piece-construction may include a facestock with an underside of adhesive. More particularly, FIG. 1B to FIG. 1G show contemplated label constructions for the label 10 of FIG. 1A. The one-piece construction may have various different components, in the form of layers. The facestock 11 is the surface that can accept ink or printing, and is transparent. The facestock 11 itself may include one or more layers, including transparent and opaque layers, top coatings, inks, varnishes, laminations, another layer of a facestock, etc. For example, an opaque ink layer 12 is shown on FIGS. 1B, 10 and 1D, and serves as a substrate, for information to be inscribed (including printed) thereon. However, the opaque ink 12 shown in FIGS. 1B and 10 may be optional. An adhesive layer 13 is coated on the underside of the facestock 11. A release liner 14 is also provided, from which the adhesive 13 with the facestock 11 can be released. For example, the release liner 14 may be a silicon coated support on which the adhesive is harboured—hence some of the figures show the release liner 14 has having a support liner 14A with a release coating 14B thereon. A difference between the constructions of FIGS. 1B, 10 and 1D is the presence of perforations in the support liner 14A in FIG. 1B, while in FIG. 1D the perforations are only in the transparent facestock 11. FIGS. 1E to 1G show an alternative to the use of the opaque ink 12, with another layer of facestock 11A on the first transparent facestock 11 described above. The other layer of facestock 11A may be white or any other color or transparent or translucent, and may be configured to have information inscribed (including printed) thereon. This other layer of facestock is selected for its complementary bond with the adhesive of the first transparent facestock 11, and may be made of a different material (e.g., a different polymer) than the first facestock layer 11. The other layer of facestock 11A may be used as an alternative to an opaque ink for its increased resistance to some types of solvents in comparison to some types of ink. Indeed, some solvents may contact the top layer of ink or facestock via the perforations, and prolonged exposure to some solvents may deteriorate inks. An adhesive layer 11B may be used to laminate the top layer of facestock 11A on the first transparent layer 11 of facestock. The configurations of FIGS. 1E to 1G differ from one another by way of the depth of the perforations. FIG. 1A shows the top side of the label 10, upon which information will be inscribed. The corners of the label 10 may be square (i.e., straight corner without radius) or rounded, for example. It is also considered to have all of the label 10 transparent, and used as a shield for another label with opaque surface sandwiched between the label 10 and the microscope slide. For example, the label 10 may for instance have the capacity of resisting xylene, 100% ethanol and 99% isopropanol immersion for at least 10 minutes. The label 10 with opaque surface would in such a scenario have data thereon.

The label 10 of FIG. 1A has five label portions, namely three panels and two folding strips. In contrast to the folding strips, the panels may have proportional width and height, although they may also not have proportional width and height. The folding strips are elongated, and thus have a height substantially greater than a width. The label 10 has three distinct panels, namely panels A, D and G. The panels A, D and G of the label 10 are separated and interconnected by a pair of folding strips BC and EF. The panel A is the panel upon which information is inscribed, whether the information is added by hand, by a printer or other means. This may include printing using a laser printer, an inkjet printer, a thermal-transfer printer or any other type of printer. Because of the presence of shielding as described hereinafter, the ink may be color ink, as the shield prevents colored ink leaching. For example, the information may be a barcode, a 3D code, a serial number, an alphanumeric text, etc. The panel A is opaque or transparent (including various degrees of transparency and opacity and any colors thereof) provided the top surface of the panel A is capable of receiving ink thereon. The panel A may also support an electronic chip, such as a RFID (Radio Frequency Identification) or NFC (Near Field Communication) chip. Moreover, the panel A may be without information, with the information being on the microscope slide instead. The label 10 would consequently protect the ink on the microscope slide.

The panel D may also be opaque or transparent and may or may not have information thereon. The panel D may also support a chip, such as a RFID or NFC chip. The panel D is used when wrapping the label 10 around a microscope slide, as explained hereinafter. The panel G is transparent and serves as a shield for the panel A by being overlaid on the panel A in the manner also described hereinafter. Panels A and G can have interchangeable functionality, with panel G receiving the information and panel A shielding the information. Therefore, as the panels A, D and G (and a fourth panel K described later) may have different characteristics, the label 10 may be composed of different layers of thermoplastic film, different inks, coatings, varnishes or adhesives to provide the panels A, D and G with the desired characteristics. Panel A and G can be interchangeable location-wise, meaning that the information can be printed on panel G and then the panel G is applied first and the panel A—transparent in this case—is overlaid onto the panel G to serve as a shield for the panel A.

The label 10 is shown as having a longitudinal dimension that is horizontal in the sheet of FIG. 1, i.e., it extends lengthwise. In this longitudinal dimension, the panels A, D and G each have a length that is generally equal to the width W of a microscope slide, although panels A and/or G could be shorter than the width W. Indeed, at least one and even possibly two of the panels A and G may have a length less than the width W of the microscope slide. In such a case, the label 10 is applied at some distance off of the microscope slide edge. In another scenario, the user prints information on a smaller surface of the label 10 and then shields only the area of the label 10 comprising information and as a consequence the shielding panel may be shorter than the width W of the microscope slide. In that same longitudinal dimension, the folding strips BC and EF may have a width that is equal to the thickness T of the microscope slide, although the width may also be slightly more or less than the thickness of the microscope slide. Therefore, the label 10 has a length L generally expressed as at least 3W+2T, with ±5% for W, i.e., there may be a 5% tolerance, and ±70% for T. The demarcation between the folding strips BC and EF (or other folding strips if more than two are present in the label) and the panels A, D and G is by way of fold lines B, C, E and F. More particularly, both sides of the folding strips BC and EF have such fold lines, i.e., the folding strips BC and EF are delimited by the fold lines. The fold lines B, C, E and F have any appropriate configuration to facilitate the folding of the label 10 at the folding strips BC and EF, with two folds preferably being formed between panels A and D, and with two more folds preferably being formed between panels D and G. The fold lines B, C, E and F may be said to be manufactured, pre-use, pre-application, as they are present in the label 10 before the label 10 is folded onto a microscope slide. The fold lines B, C, E and F are present when the label 10 is on its support liner 14. According to an embodiment, the fold lines B, C, E and F are made by way of a sequence of cuts H separated by portions I of the label 10 that are not cut. The cuts H are in a line and spaced apart from one another by portions I, also known as webs. Other configurations for fold lines are considered, such as microperforations, scoring or creasing of the facestock material, thinner facestock at the fold lines B, C, E and F, pre-defined or creased folds, etc. Label 10 may have an additional $4^{th}$ transparent panel and folding strip to allow folding of the such a panel underneath the slide to be overlaid onto and to shield the panel D. These additional $4^{th}$ transparent panel and folding strip may be an extension lengthwise of the label 10 at the end of panels A or G, or may be the arrangement of FIG. 4 or of FIG. 10.

Figure 2:
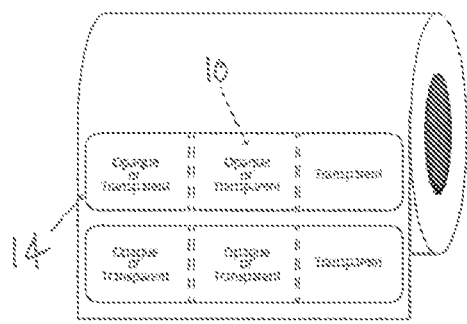
FIG. 2 is a perspective view of a plurality of the labels of FIG. 1A on a support liner roll.
Figure 3:
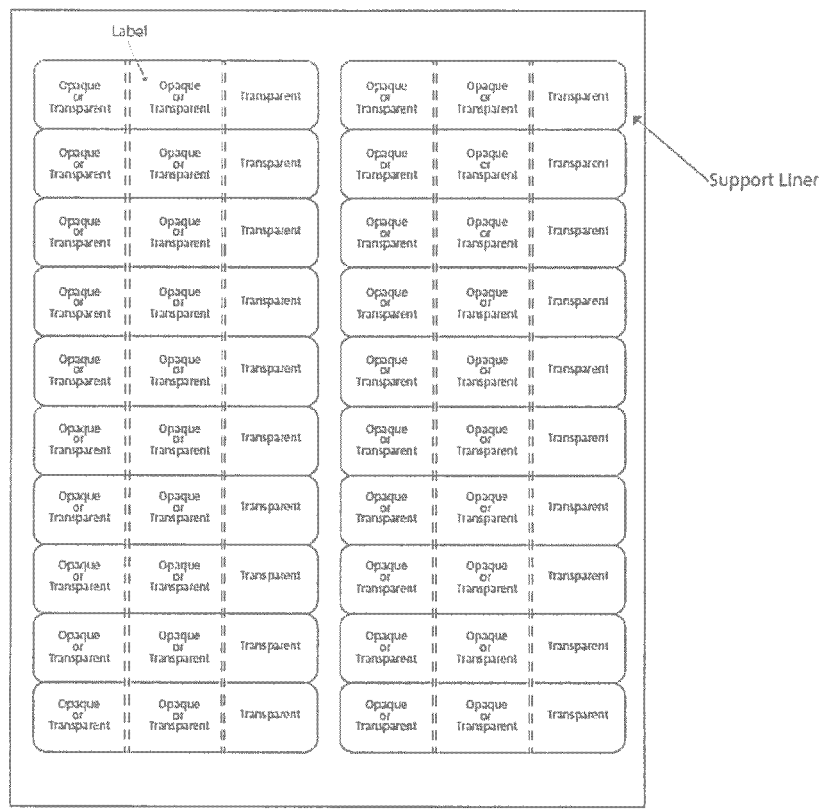
FIG. 3 is a face view of a plurality of the labels of FIG. 1A on a support liner sheet.

Referring to FIGS. 2 and 3, a plurality of the labels 10 are shown in different formats, configurations and packaging possibilities. As the label 10 has an adhesive on its underside, a plurality of the labels 10 may be on a support liner roll as in FIG. 2 or on a support liner sheet as in FIG. 3. The support liner roll and the support liner sheet may be the support liner 14 (e.g., FIGS. 1B to 1G) or the support liner 14 may be adhered onto the roll or the sheet. In the embodiments of FIGS. 2 and 3, the printer and related computer program are configured knowing the location of the panels A and possibly D in the roll or sheet of FIGS. 2 and 3 respectively for printing at the adequate location on the labels 10. The orientation of the labels 10 on the support liner may be landscape or portrait.

Figure 4:
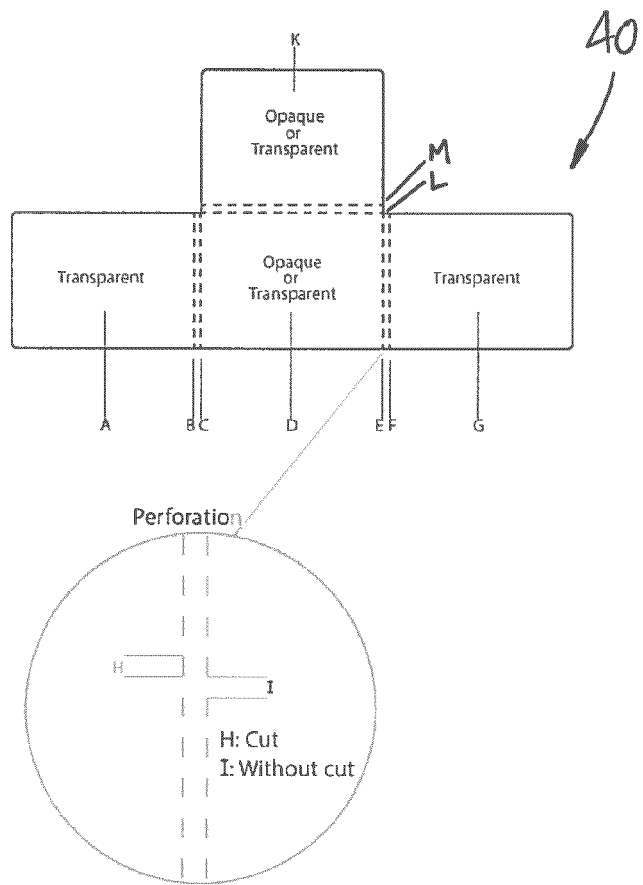
FIG. 4 is a face view of a label for a microscope slide in accordance with another embodiment of the present disclosure, with a zoom window showing a folding strip thereof.
Figure 5:
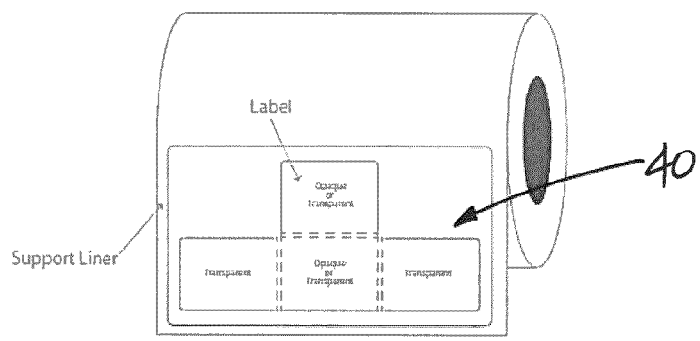
FIG. 5 is a perspective view of the label of FIG. 4 as mounted to a support liner roll.

Referring to FIG. 4, a label in accordance with another embodiment of the present disclosure is generally shown at 40 and shares numerous parts with the label 10 of FIGS. 1 to 3. Therefore, like components will share like reference numerals in the present description and figures. The label 40 has seven label portions in contrast to the five label portions of the label 10. In addition to the panels A, D and G, as well as the folding strips BC and EF with fold lines B, C, E and F, the label 40 has another panel K that is separated from the panel D by way of another folding strip LM delimited by a pair of fold lines L and M. The folding strip LM may have a width matching closely the thickness T of the microscope slide in similar fashion to the folding strips BC and EF. The panel K may or may not have similar dimensions as the panels A, D and G, with a length in the longitudinal dimension generally equal to the width W of a microscope slide. For example, it may be narrower or shorter. In label 40, the panels D and K are opaque or transparent while panels A or G are transparent. In the label 40 of FIG. 4, information is inscribed on the panel K although it is contemplated to have the data inscribed on any one of panels A, D and G, as well. If one of the panels A, G and K has information inscribed thereon, the other two panels are transparent. As shown in FIG. 5, the label 40 may be on a support liner roll and although not shown, the label 40 may also be on a support liner sheet. The panels of the label 40 that carry the ink or print may be opaque or transparent, whereas the panels that are overlaid onto the information-bearing panels are transparent, to make up a transparent shield allowing the information to be seen through them. Panel K and its folding strip LM may be connected to panel A or G, to cover panel D, as an alternative to the arrangement of FIG. 5.

Figure 8:
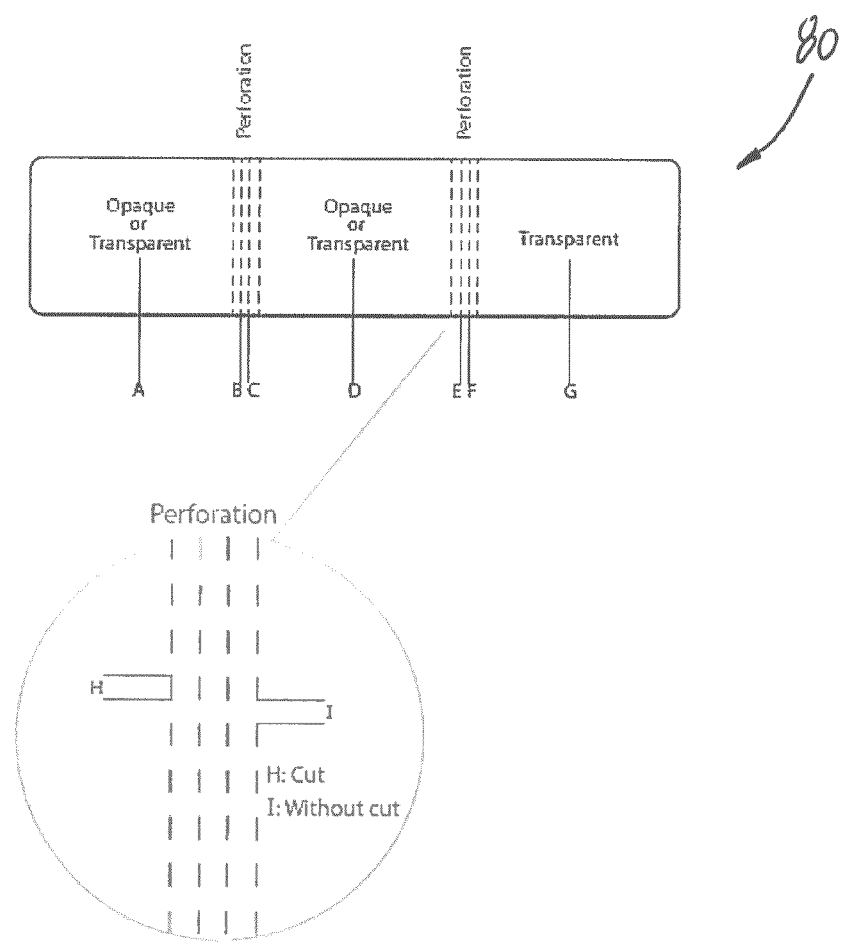
FIG. 8 is a face view of a label for a microscope slide in accordance with yet another embodiment the present disclosure, with a zoom window showing an embodiment of a folding strip thereof.
Figure 9:
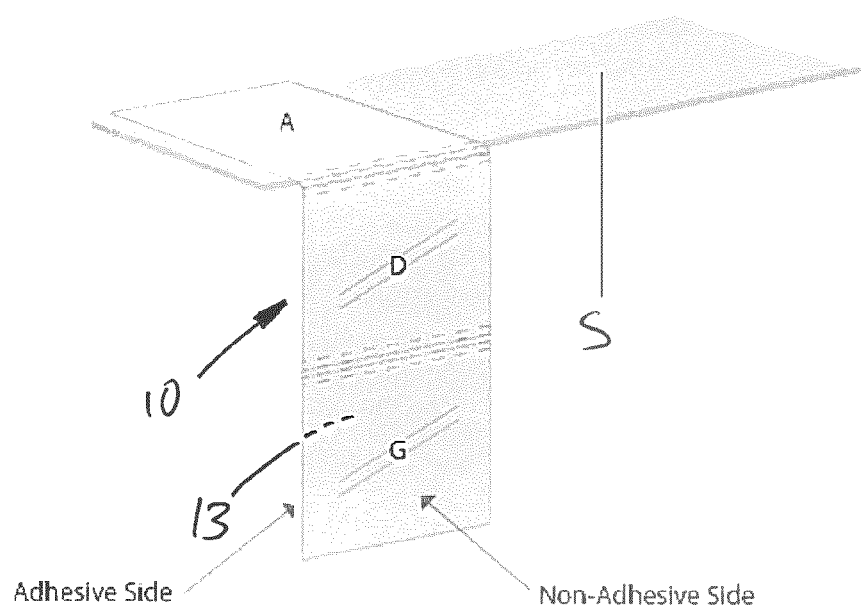
FIG. 9 is a perspective view of the label of FIG. 8 being installed on a microscope slide.

Referring to FIG. 8, another label in accordance with the present disclosure is shown at 80. The label 80 has numerous components in common with the label 10 of FIG. 1, whereby like components will bear like reference numerals. Moreover, the construction may be the same or similar. A difference between labels 10 and 80 is the presence of more than the two fold lines B,C between panels A and D, and/or more than the two fold lines E,F between panels D and G. In FIG. 8, the label 80 has four fold lines between adjacent panels, and this arrangement of more than two fold lines may also be present in the label 40 of FIG. 4, or label 100 of FIG. 10. The presence of these additional fold lines increases the width of the folding strip section with more than two fold lines. As another embodiment, the presence of more than two fold lines between adjacent pairs of the panels creates other folding strips. For example, as shown from the zoom of FIG. 8, there may be three folding strips between panels D and G, and between panels A and D. Though three folding strips are shown in FIG. 8, there may be two or more folding strips in the embodiment. Accordingly, as shown in FIG. 9, the wider folding strips provide more maneuverability when positioning the label 80 on the side edge of the microscope slide. For example, if the side edge of the microscope slide is not precisely between the fold lines B,C, the user may rely on the additional fold lines to facilitate the folding of the panels A and D onto the respective main surfaces of the microscope slide. In an embodiment featuring the additional fold lines, the panels A and/or G may be shorter in the length direction than the panel D, for instance up to 20% shorter.

FIG. 10 shows yet an additional label at 100. The label 100 has numerous components in common with the label 40 of FIG. 1, whereby like components will bear like reference numerals. Moreover, the construction may be the same or similar, i.e., as in any one of FIGS. 1B to 1G. A difference is the connection of the panel K to the panel A, instead of being connected to the panel D, as in FIG. 4. As a consequence, when the label 100 is installed on the microscope slide, the panel K shields panel D, or vice versa. All in all, the label 100 has shields on both sides of the microscope slide. The label 100 may also have the numerous fold lines of FIGS. 8 and 9.

Now that the configuration of the labels 10 and 40 has been described, an application or installation thereof on a microscope slide is set forth.

Referring to FIGS. 6A to 6D, there is illustrated the application of the label 10 on a microscope slide. According to FIG. 6A, with the label 10 having been removed from its support liner 14 (including in the form of rolls or sheets as in FIGS. 2 and 3), the label 10 is positioned and oriented relative to the microscope slide S such that the panel D is aligned with an end of the microscope slide S, with the underside with adhesive 13 facing toward a first face of the microscope slide S (typically, the underface). Information may have been printed previously on the panel A. The adhesive side 13 of panel D is then brought into contact with the surface of the microscope slide S to adhere the panel D to the microscope slide S in the manner shown in FIG. 6B. Once that is done, the panel A and folding strip BC will extend laterally on one side of the slide S, and the panel G and folding strip EF will extend laterally on the other side of the slide S. The fold lines B, C and E, F of the folding strips BC and EF, respectively, are aligned with the edges of the thickness of the microscope slide S. As the fold lines are aligned with the edges, the edges facilitate the folding of the label 10 in the manner shown in FIG. 6B, with the folding strips BC and EF adhering against the thickness surface of the microscope slide S. As the panel A has the information thereon, it is first folded onto the microscope slide S in such a way that top surface faces away from the microscope slide S, with the information printed thereon exposed. In the process, the underside of panel A adheres to the surface of the microscope slide S, via its adhesive. If information has not yet been inscribed onto the label 10, the user may add text, markings or ink to the top surface of panel A, before panel G is folded over panel A. The panel G is applied planarly against the panel A and thus against the microscope slide S in the manner shown in FIG. 6C. The folding of panel G is also facilitated by the presence of the folding strip EF that has the same thickness T as the microscope slide S. Consequently, the panel G forms a protective layer that isolates the panel A from exposure to manipulations and solvents or chemicals. As the panel G is transparent, it is possible to see through the information inscribed on the panel A or scan a barcode on the panel A using a barcode scanner. Due to the sizing of the label 10, little or no space is formed between the label 10 and the microscope slide S, limiting infiltration of liquids between the label 10 and the microscope slide S.

Figure 6:
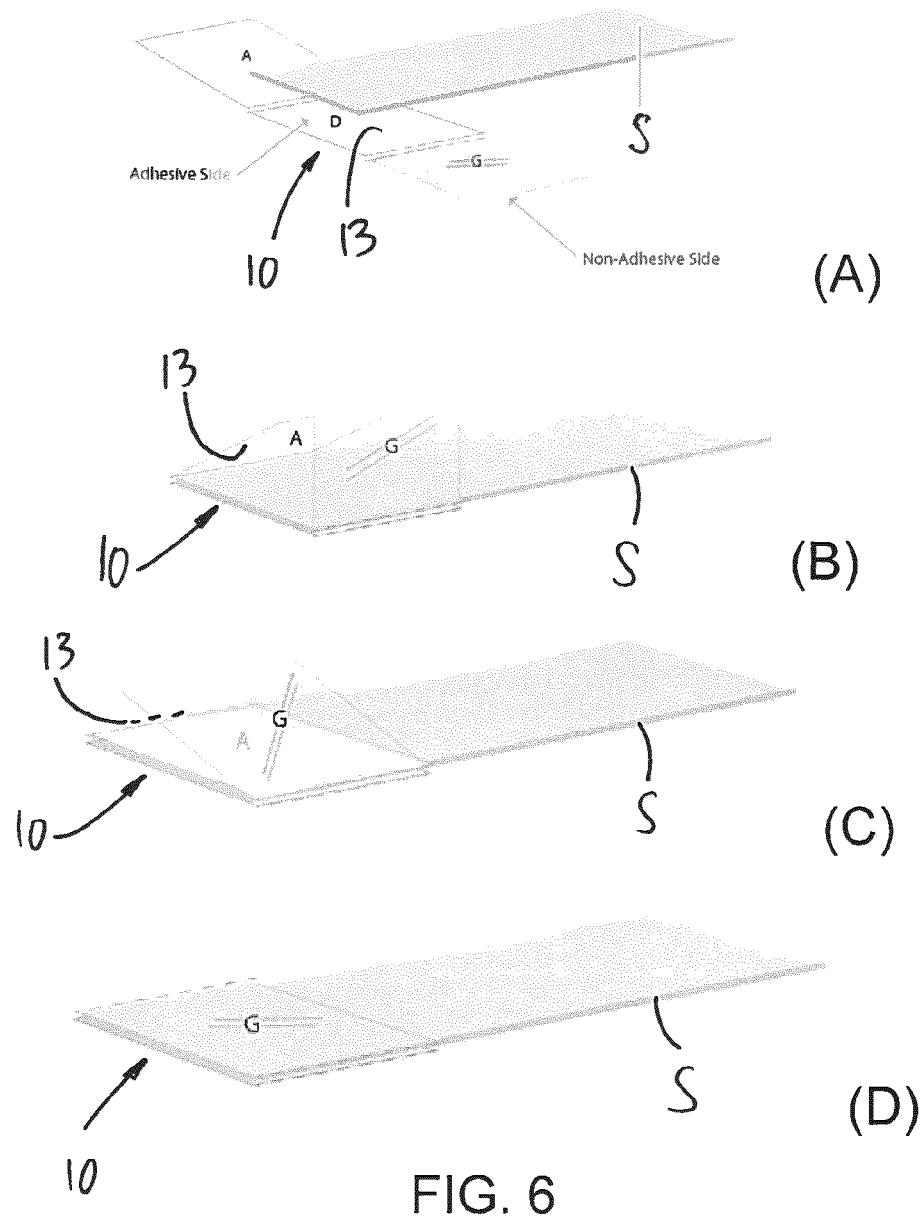
FIGS. 6A to 6D are a sequence showing a method of applying the label of FIG. 1A to a microscope slide.
Figure 7:
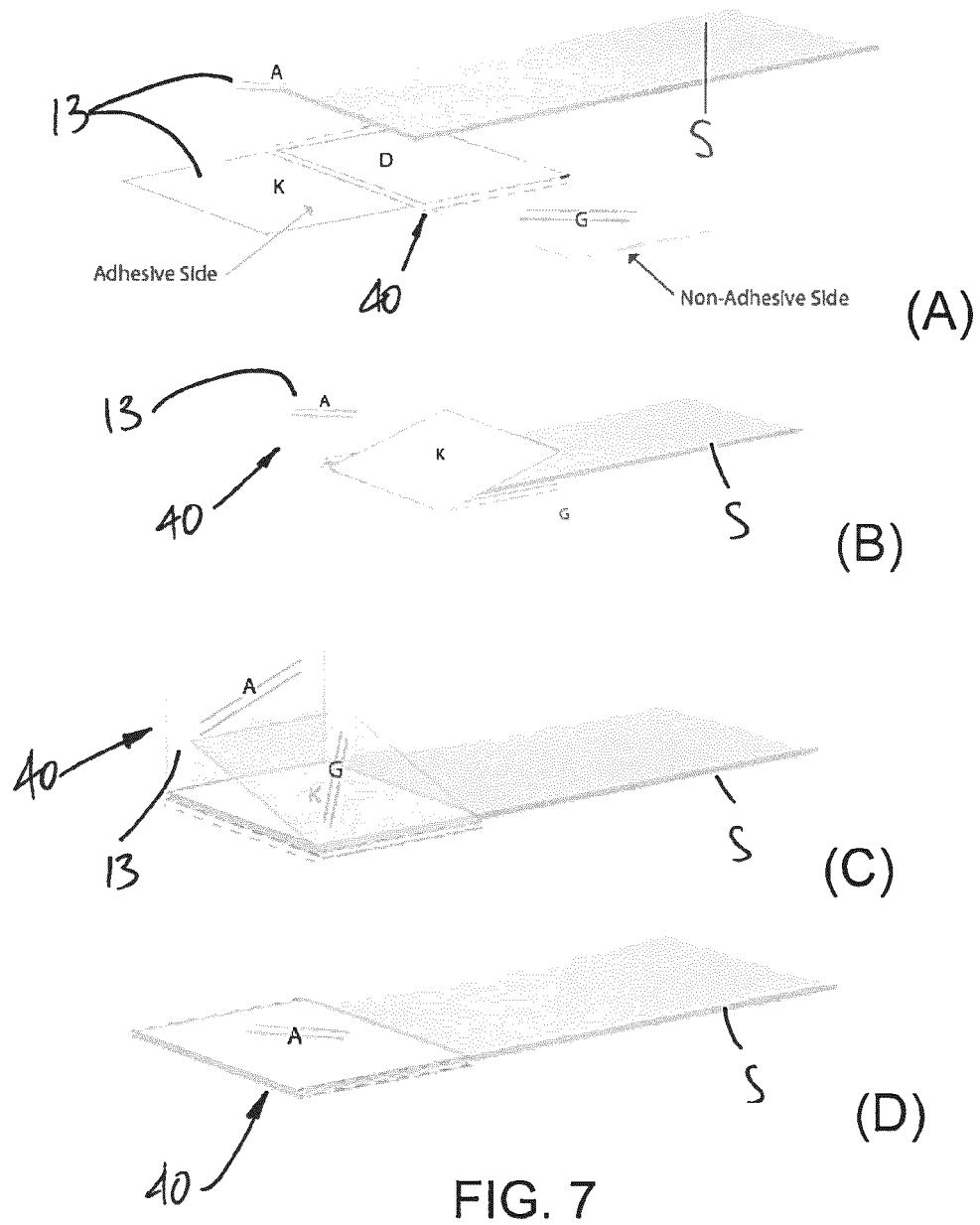
FIGS. 7A to 7D show a sequence of a method for installing the label of FIG. 4 to a microscope slide.

FIGS. 7A to 7D show the application of label 40 to a microscope slide S. According to FIG. 7A, with the label 40 removed from its support liner 14, the adhesive side 13 faces the microscope slide S, and the panel D is aligned with the end of the microscope slide S, in similar fashion to the positioning of label 10 in FIG. 6A. The positioning of the panel D of the label 40 on the microscope slide S is such that the folding strips BC, EF between panels D and K are aligned with the edges of the microscope slide S. As a first operation, if information is inscribed on panel K, the panel K is first folded onto the microscope slide S as shown in FIG. 7B. If information is not inscribed thereon but the panel K is destined to receive information, after FIG. 7B, the user may add information on the panel K. The protective transparent panels A and G may be folded onto the panel K, in the manner shown in FIGS. 7C and 7D. Any other sequence may be used, for instance, by adhering panels A or G first, even before panel D, etc. This may depend on which of the panels A, G and K receives information thereon. FIGS. 6 and 7 show the panel D as being white, which may entail that it has an opaque ink. However, panel D may also be without such opaque ink considering that the ink without protective shield may dissolve when exposed to chemicals and solvents. Hence, although shown as being opaque, panel D may be transparent/without opaque ink. Moreover, as described hereinafter, the panel D may also be shielded, for example by a fourth panel, such as panel K in FIG. 10 to have information on both sides of the microscope slide. This would allow to double the information on the same slide.

Stated differently, the method of FIGS. 6 and 7 is for applying a label 10/40/80/100 onto a microscope slide S having a width W and a thickness T. The method may be executed by automated equipment, or may also be performed manually. The method has for example a sequence of steps including: adhering a first panel of the label to cover the width W of a first face of a section of the microscope slide, with a first folding strip and a second panel of the label extending on one side beyond the section of the microscope slide, and with second folding strip and a third panel of the label extending on another side beyond the section of the microscope slide; folding the label such that the first folding strip covers the thickness T of the one side of the section of the microscope slide, and the second panel adheres to a second face of the section of the microscope slide, the second panel displaying information thereon facing away from the microscope slide; and folding the label such that the second folding strip covers the thickness T of the other side of the section of the microscope slide, and the third panel adheres to and transparently covers the second panel. Opaque and transparent panel locations within the labels described above may be changed and subsequently the sequence of applying panels to the microscope slide will change, provided at least one panel is transparent to shield the panel(s) it is overlaid onto and carrying the information, the panels being separated with folding strips comprising perforations.

The invention claimed is:

1. A label for a microscope slide having a width W and a thickness T, the label comprising:
    a body having a top side and an underside with adhesive, the body defining
    at least a first panel, a second panel and a third panel, at least one of the panels configured to cover the width W of a section of the microscope slide,
    at least two folding strip sections, a first of the folding strip section being between the first panel and the second panel, a second of the folding strip section being between the second panel and the third panel, the folding strip sections configured to cover the thickness T of the section of the microscope slide, and
    pre-application fold lines demarcating the folding strip sections from the adjacent panels;
    wherein the adhesive on the underside of the body is an adhesive layer covering all of the underside; and
    wherein the first panel is configured to receive information thereon or to cover information on the microscope slide, and the third panel is transparent.

2. The label according to claim 1, wherein the second panel is between the first panel and the third panel in an elongated direction of the body.

3. The label according to claim 2, wherein the second panel has a width equal to W±5% in the elongated direction.

4. The label according to claim 2, further comprising a fourth panel and a third folding strip section, the fourth panel connected to another one of the panels by the third folding strip section.

5. The label according to claim 4, wherein the fourth panel is connected to the first panel or to the third panel by the third folding strip section, such that the body has a L shape.

6. The label according to claim 4, wherein the fourth panel is connected to the second panel the third folding strip section, such that the body has a T shape.

7. The label according to claim 1, wherein the pre-application fold lines are defined by spaced apart cuts in a facestock of the body.

8. The label according to claim 1, wherein each folding strip section has at least two parallel pre-application fold lines.

9. The label according to claim 8, wherein the two parallel pre-application fold lines are separated by a distance equal to T±70%.

10. The label according to claim 1, wherein at least one folding strip section has at least three parallel pre-application fold lines.

11. The label according to claim 10, wherein adjacent pairs of the pre-application fold lines of the at least one folding strip section are separated by a distance equal to to T±70%.

12. The label according to claim 1, wherein the first panel is opaque or transparent.

13. The label according to claim 1, wherein the second panel is opaque or transparent.

14. The label according to claim 1, further comprising a support liner upon which the body is releasably adhered.

15. The label according to claim 14, further comprising a release coating on the support liner.

16. The label according to claim 1, wherein the body has a transparent facestock with an adhesive layer defining the underside.

17. The label according to claim 16, wherein the body has an opaque ink on at most two of the panels, the third panel being without the opaque ink.

18. The label according to claim 16, further comprising another facestock layer on the transparent facestock, with an adhesive layer between the other facestock layer and the transparent facestock layer.

19. The label according to claim 18, wherein the other facestock layer is transparent or opaque.

20. A label for a microscope slide having a width W and a thickness T, the label comprising:
    a body having a top side and an underside with adhesive, the body defining
    at least a first panel, a second panel and a third panel, at least one of the panels configured to cover the width W of a section of the microscope slide, the second panel being between the first panel and the third panel in an elongated direction of the body,
    at least two folding strip sections, a first of the folding strip section being between the first panel and the second panel, a second of the folding strip section being between the second panel and the third panel, the folding strip sections configured to cover the thickness T of the section of the microscope slide,
    a fourth panel and a third folding strip section, the fourth panel connected to another one of the panels by the third folding strip section, and
    pre-application fold lines demarcating the folding strip sections from the adjacent panels;
    wherein the first panel is configured to receive information thereon or to cover information on the microscope slide, and the third panel is transparent.

21. A label for a microscope slide having a width W and a thickness T, the label comprising:
    a body having a top side and an underside with adhesive, the body having a transparent facestock with an adhesive layer defining the underside, the body defining
    at least a first panel, a second panel and a third panel, at least one of the panels configured to cover the width W of a section of the microscope slide,
    at least two folding strip sections, a first of the folding strip section being between the first panel and the second panel, a second of the folding strip section being between the second panel and the third panel, the
folding strip sections configured to cover the thickness
T of the section of the microscope slide, and pre-application fold lines demarcating the folding strip
sections from the adjacent panels;

another facestock layer being on the transparent facestock, with an adhesive layer between the other facestock layer and the transparent facestock layer;

wherein the first panel is configured to receive information thereon or to cover information on the microscope slide, and the third panel is transparent.

22. A label for a microscope slide having a width W and a thickness T, the label comprising:

a body having a top side and an underside with adhesive, the body defining at least a first panel, a second panel and a third panel, at least one of the panels configured to cover the width W of a section of the microscope slide, at least two folding strip sections, a first of the folding strip section being between the first panel and the second panel, a second of the folding strip section being between the second panel and the third panel, the folding strip sections configured to cover the thickness T of the section of the microscope slide, and pre-application fold lines demarcating the folding strip sections from the adjacent panels;

at least one electronic chip secured to the label;

wherein the first panel is configured to receive information thereon or to cover information on the microscope slide, and the third panel is transparent.

* * * * *